March 11, 1941.    W. A. WEBB    2,234,921
APPARATUS FOR COUNTERCURRENT TREATMENT OF IMMISCIBLE FLUIDS
Filed Sept. 13, 1938    5 Sheets-Sheet 1

INVENTOR.
Wells Alan Webb.

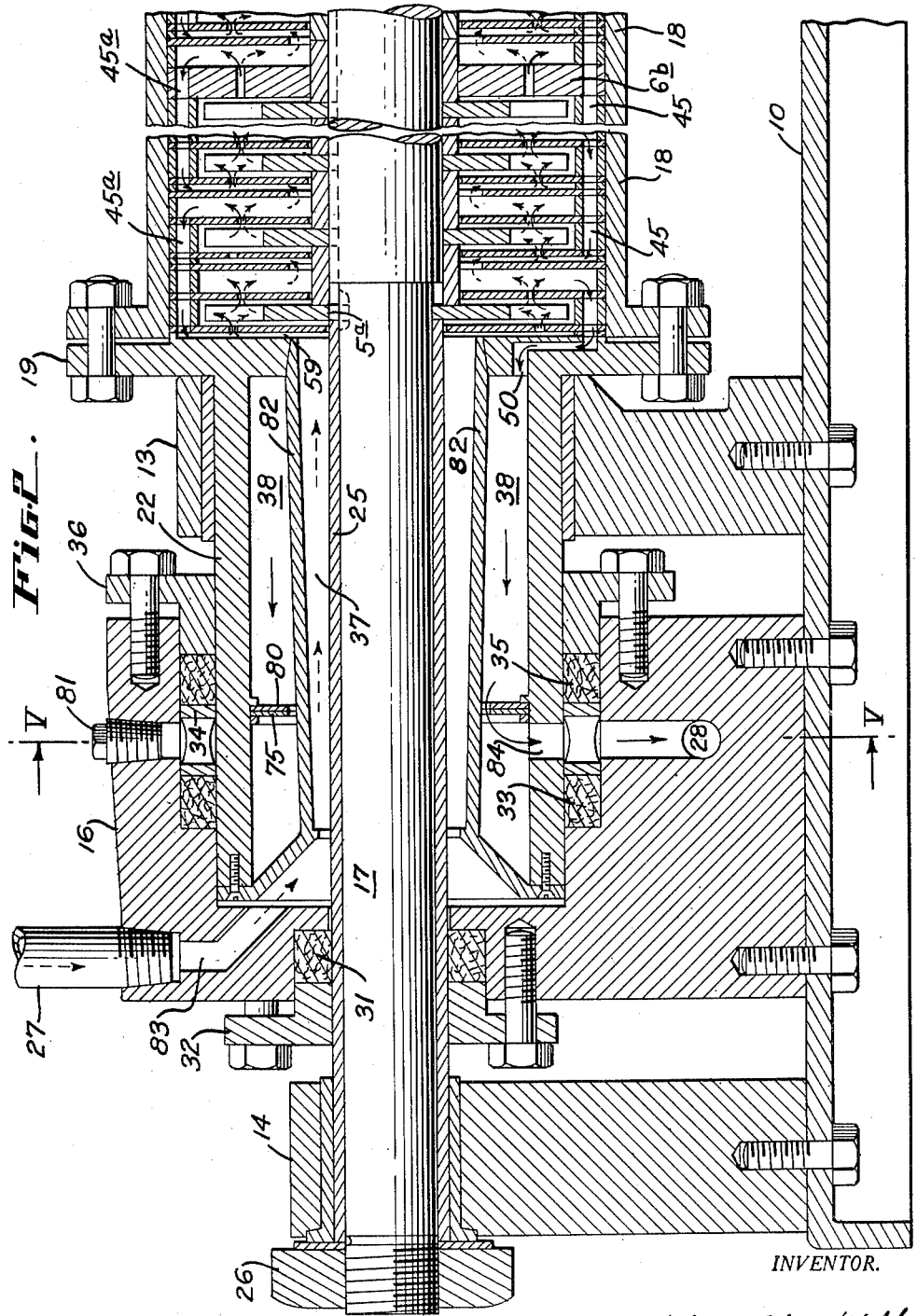

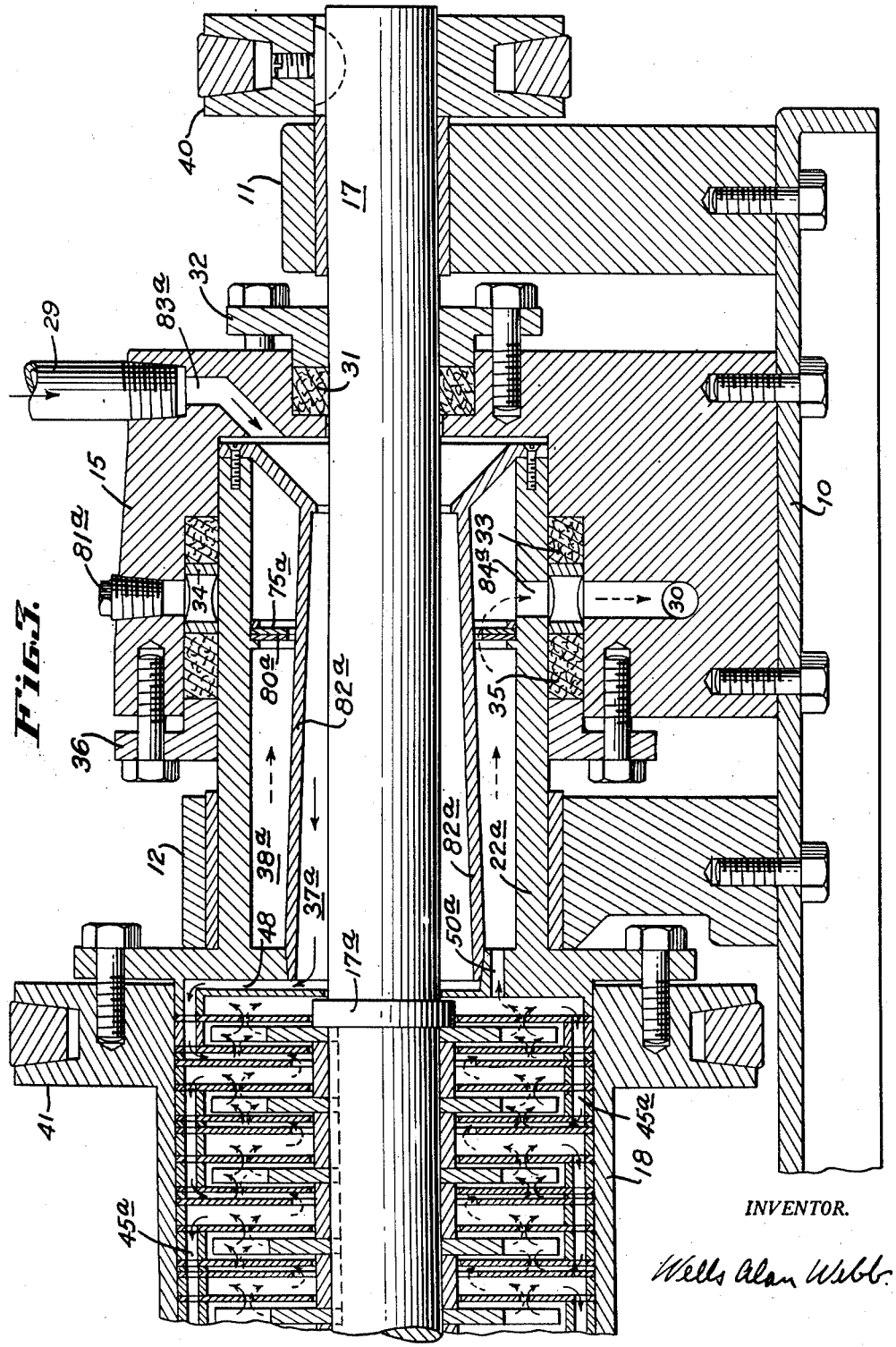

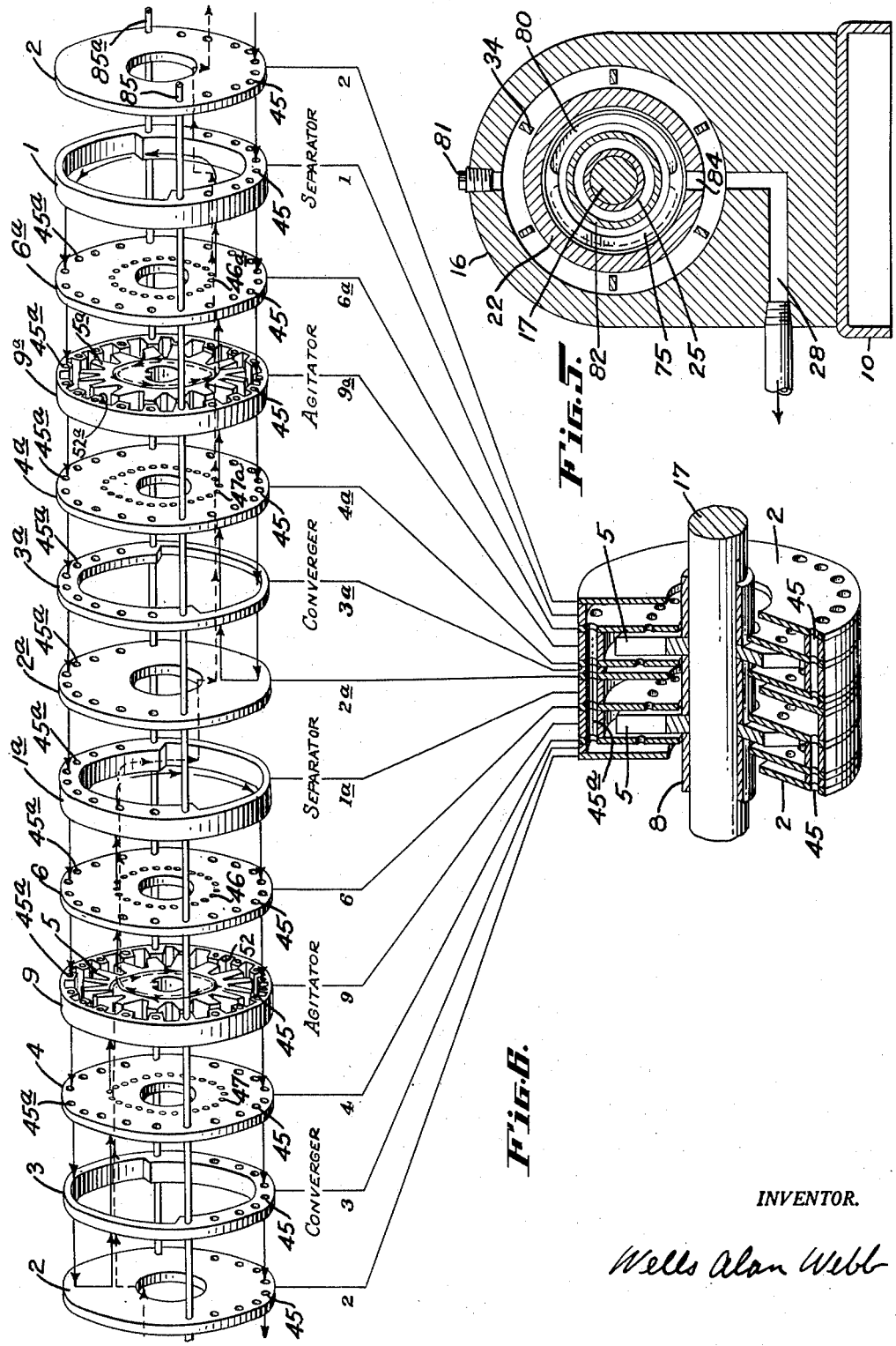
March 11, 1941. W. A. WEBB 2,234,921
APPARATUS FOR COUNTERCURRENT TREATMENT OF IMMISCIBLE FLUIDS
Filed Sept. 13, 1938 5 Sheets-Sheet 4
INVENTOR.
Wells Alan Webb March 11, 1941.   W. A. WEBB   2,234,921
APPARATUS FOR COUNTERCURRENT TREATMENT OF IMMISCIBLE FLUIDS
Filed Sept. 13, 1938   5 Sheets-Sheet 5
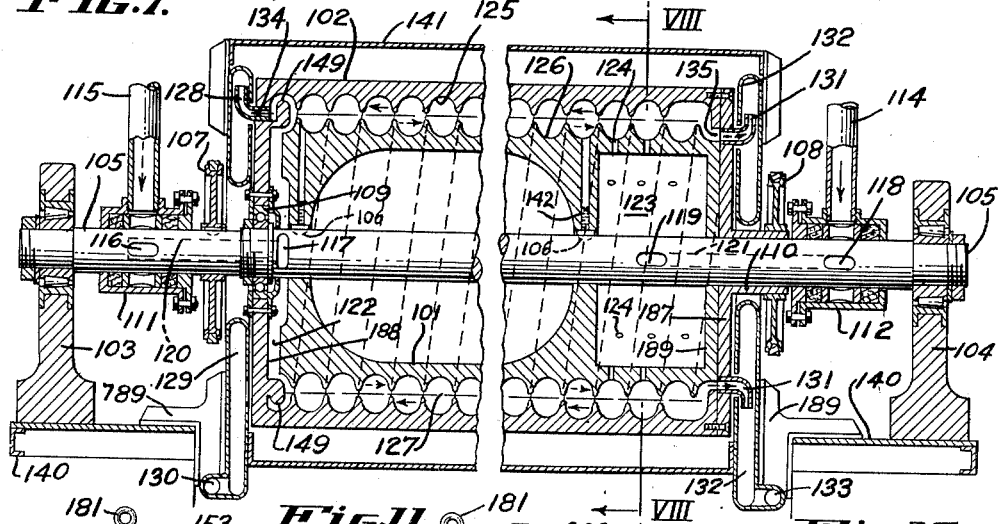
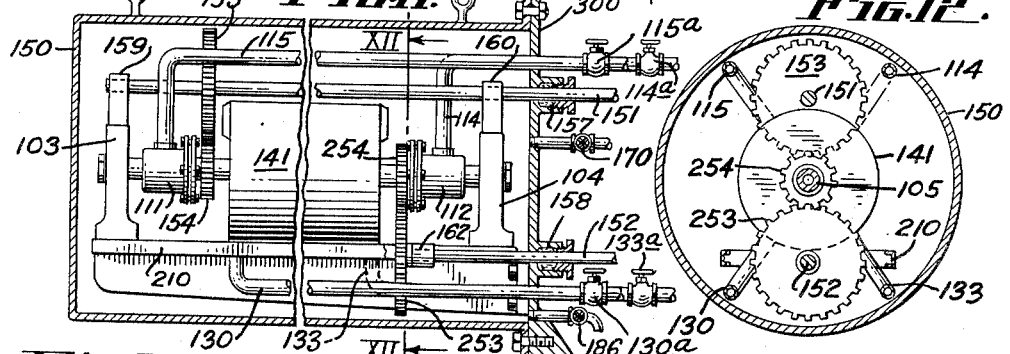
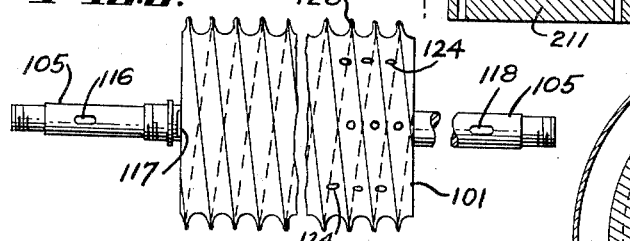
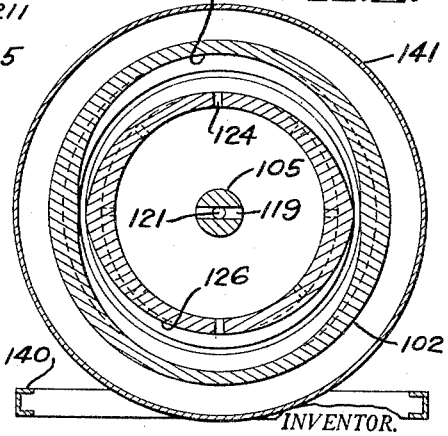
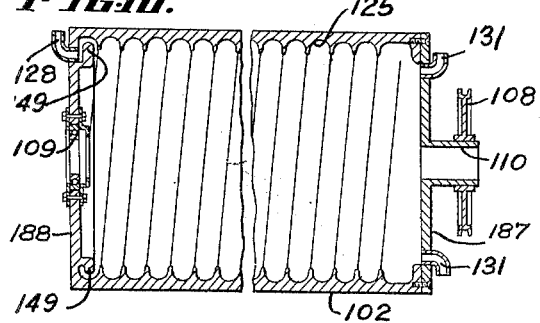
INVENTOR.
Wells Alan Webb Patented Mar. 11, 1941

2,234,921

UNITED STATES PATENT OFFICE 2,234,921

APPARATUS FOR COUNTERCURRENT TREATMENT OF IMMISCIBLE FLUIDS

Wells Alan Webb, Albany, Calif., assignor of forty per cent to William D. Ramage, Berkeley, Calif., and ten per cent to Robert M. McManigal, Compton, Calif.

Application September 13, 1938, Serial No. 229,793

8 Claims. (Cl. 261—83)

The present invention relates to the art of countercurrent extraction or the contacting of a pair of immiscible fluids in counterflow relationship. More specifically, the present invention relates to compact means for carrying out countercurrent extraction over a large area of counterflow between a pair of immiscible liquids or a liquid and a vapor.

The preferred operation of the present invention comprises the passing of two substantially immiscible fluids of differing densities through fluid conducting means countercurrently into proximity with contacting means comprising a rotating impervious housing and an independently rotating internal member, and passing the fluids out of proximity with said contacting means. The operation also contemplates propulsion of the fluids in counterflow, through the contacting means in order to facilitate countercurrent contacting of the fluids in from five to one hundred or more equivalent stages.

Through pressure retaining means, operation of the present invention is facilitated in the countercurrent treatment of one or more liquified substances normally gaseous.

Two preferred forms are shown in the drawings appended hereto by way of example only. In one form of the invention, agitators are carried on the rotating internal member, while baffles and conduits are arranged in the impervious housing, said agitators, baffles and conduits comprising a plurality of stages arranged in contiguous relationship. In the second form the invention is embodied in a male screw of sufficient diameter to just clear the tips of the threads of a female screw into which it fits, said female screw being cut on the inside of a member to form a rotating impervious housing. In the latter form of the invention, countercurrent contacting and propulsion of the fluids takes place between the screws.

The machines built according to the present invention are particularly useful in those countercurrent processes which require a large number of equivalent stages. Some examples of such processes are indicated below:

To separate butane from gasoline by distillation, it is customary to employ tall and expensive fractionating columns having as many as one hundred equivalent stages; to remove mercaptans almost entirely from gasoline, a score or more of countercurrent stages are needed but are not used on account of the bulk and expense of the equipment; to recover pure vitamin A from fish liver oils according to a method such as that described by Cornish, Archibald, Murphy and Evans in "Industrial and Engineering Chemistry," vol. 26, page 397, two hundred or more stages of countercurrent extraction are necessary. In processes of the types just cited the advantages of economy, improvement of product and increase in yield will be gained either singly or severally by the adoption of apparatus constructed according to the present invention for the countercurrent contacting means.

A further object of the present invention is to provide economical countercurrent contacting means in a large number of stages for a pair of fluids, one or both of which are normally gaseous, but are maintained in the liquid state by pressure.

My invention has many other objects, advantages, and features, some of which, with the foregoing, will be set forth at length in the following description where I shall outline certain forms of my invention, which I have selected for illustration in the drawings accompanying and forming a part of the present specification. In said drawings, I have shown certain forms of my invention, but it is to be understood that I do not limit myself to such forms, since the invention, as expressed in the claims, may be embodied in a large plurality of forms.

Referring to the drawings:

Fig. 2 is a sectional side elevation of a part of the left hand portion of the machine shown in Fig. 1.

Fig. 3 is a sectional side elevation of a part of the right hand portion of the machine shown in Fig. 1.

Fig. 5 is a sectional view of the stuffing box housing taken through V—V in Fig. 2.

Fig. 6 is a diagrammatic drawing showing in perspective some of the whole elements of the apparatus shown in Fig. 1 arranged in order for assembly and in two thirds section Fig. 6 shows the elements assembled on a central shaft.

Fig. 7 is a side elevation of an apparatus constructed according to this invention in which the contacting and propelling means are a male and female screw.

Fig. 8 is a sectional view through VIII—VIII of the apparatus shown in Fig. 7.

Fig. 9 is a sectional side elevation of the male screw, or internal rotating member.

Fig. 10 is a sectional side elevation of the female screw, or rotating impervious housing.

Fig. 11 is a side elevation of an apparatus constructed according to this invention placed in a pressure retaining case, and with the case showing in section.

Fig. 12 is a sectional view through XII—XII of the apparatus shown in Fig. 11.

In the more detailed specification that follows, the agitator-settler type of apparatus as shown in Figs. 1 to 6 inclusive will first be described, then the screw-type of apparatus as shown in Figs. 7 to 12 inclusive will be described. After a study of the specification, combinations and variations of the features of both apparatus will become obvious to persons skilled in the art, so they will be enabled to build a variety of different apparatus, all within the scope of the present invention.

Figure 1:
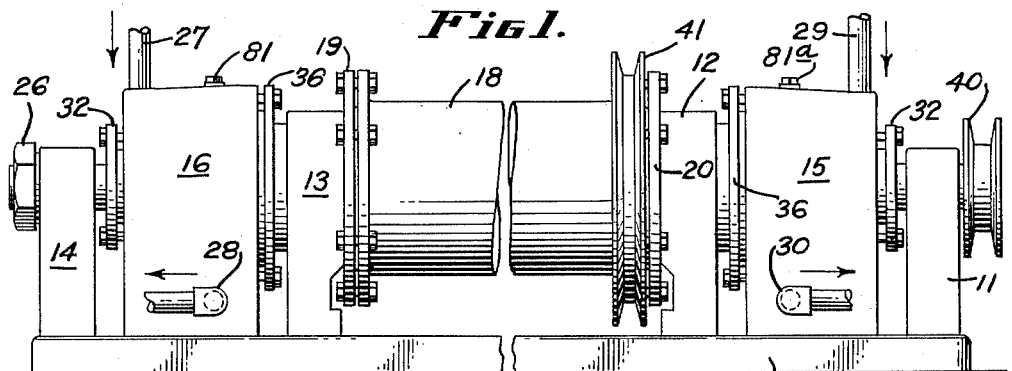
Fig. 1 is a side elevation of an apparatus constructed according to this invention in which the contacting and propelling means are agitators and settling chambers arranged in contiguous relationship to form stages.

With reference particularly to Figs. 1 to 6 inclusive wherein like characters of reference designate corresponding parts throughout the several views:

In Figure 1, the apparatus is shown mounted on a base 10 that supports bearings 11, 12, 13 and 14, and packing boxes 15 and 16. 18 is a cylindrical shell provided with removable flanges 19 and 20, and pulley 41. Figures 2 and 3 show that flanges 19 and 20 are integral with sleeves 22 and 21 respectively; said sleeves are rotatively mounted in bearings 13 and 12, and so are adapted to permit shell 18 to rotate. Agitator shaft 17 extends through shell 18 and is mounted to rotate in bearings 14 and 11. One or more bearings 6b may be provided inside of shell 18 for the purpose of steadying shaft 17. One of such bearings is shown in Fig. 2.

The packing boxes 16 and 15 are each adapted to communicate two fluid phases with the interior of the machine. In packing box 16 one fluid enters through pipe 27; another fluid leaves through pipe 28. Similarly with packing box 15, one fluid enters through pipe 29 and another leaves through pipe 30. To prevent escape of the fluids, packing glands are provided.

In packing box 16, packing 31 is pressed against sleeve 25 on shaft 17 by means of gland 32. Packings 33 and 35 are pressed against sleeves 22 and 22a by gland 36. Force from glands 36 is transmitted through packings 35 and spider ring 34 to compress packing 33. Because of the form of construction described, a fluid entering pipe 27 under pressure can go only down channels 83 and 37 and into the interior of the machine via channel 59 according to the pathway indicated by the arrows. Likewise a fluid leaving the interior of the machine via channel 38 can pass nowhere else but out pipe 28.

Packing box 15 is constructed in a manner similar to packing box 16. Hence fluid forced into pipe 29 flows into the interior of the machine through channels 83a and 37a, and fluid leaving the machine through channel 38a passes out only through pipe 30. To reduce the pressure difference on the packings, when treating liquified normally gaseous fluids, the machine may be encased in a pressure vessel as indicated by the numeral 150 in Figs. 11 and 12.

In order to be treated in the machines constructed according to this invention, the two fluids must have different densities. In the drawings the direction of the flow of the less dense fluid is represented by arrows with broken shafts, and the direction of flow of the more dense fluid is represented by arrows with solid shafts.

The denser fluid enters pipe 29, passes through ports 83a and 37a and into shell 18 via port 48. Although the denser fluid makes frequent reversals of path when it is inside of shell 18, in general, the trend of motion of said denser fluid is from the right hand end of shell 18 toward the left hand end of shell 18 by way of channels 45 and 45a. After the denser fluid has traversed the full length of shell 18 from right to left, it emerges at the left hand end of shell 18 and passes through channel 50 into annular space 38, from whence it spills over the inner lips of level regulating rings 75 and 80 and passes out of the machine via channel 84 and pipe 28.

Centrifugal force created by the rotation of shell 18 causes the denser fluid in the quiescent zones to occupy the spaces near to the circumferences while the less dense fluid rides on the inner surface of the denser fluid, and occupies, in the quiescent zones, spaces closer to the axis of rotation.

The less dense fluid enters pipe 27, passes through annular port 37 and into the left hand side of shell 18 via port 59. The less dense fluid passes through shell 18 from left to right, and flows countercurrently to the heavier fluid. Countercurrent contacting of the less dense fluid with the denser fluid within shell 18 is accomplished by the various discs, agitators, and spacers shown assembled within shell 18 in Figs. 2 and 3 and illustrated more in detail in Figs. 4 and 6. The less dense fluid emerges from the right hand end of shell 18 via channels 50a and 38a and passes out of the machine through pipe 30.

Shaft 17 is rotated by power applied by a belt to pulley 40. Tube 18 is rotated by power applied with a belt to pulley 41. It is preferred to rotate shell 18 at from 400 to 1800 revolutions per minute. Shaft 17 is rotated preferably in the same sense as shell 18, but at a somewhat slower speed. For certain applications, especially where the two fluids are difficult to separate, higher speeds may be necessary. For other applications, and especially for very large machines, slower speeds are preferred. The machine can also be adapted to operate with shaft 17 stationary, or rotating in the opposite sense from shell 18.

Keyed upon shaft 17 are a plurality of agitators 5 separated, each from the agitator adjacent, by spacers 8. Nut 26 on the left extremity of shaft 17 is made tight against sleeve 25. Sleeve 25, by bearing against agitator 5a compresses the whole assembly of agitators and spacers against collar 17a in shaft 17.

The parts that are assembled to rotate as a unit with tube 18 are: separator spacer 1, separator disc 2, converger spacer 3, agitator inlet disc 4, agitator spacer 9, agitator outlet disc 6. These parts are assembled in tube 18, from left to right in the order listed above. Parts 1, 2, 3, 4, 9 and 6 together with agitator rotor 5 and agitator washer 8 form the elements for a stage comprising mixing, propelling and separating means, and parts 1a, 2a, 3a, 4a, 9a and 6a together with agitator rotor 5a and agitator washer 8a form the elements for a contiguous stage.

The spacers and disc are prevented from shifting in relationship to each other by rods 85 and 85a which engage in holes bored into the inner faces of flanges 19 and 20.

Figure 4:
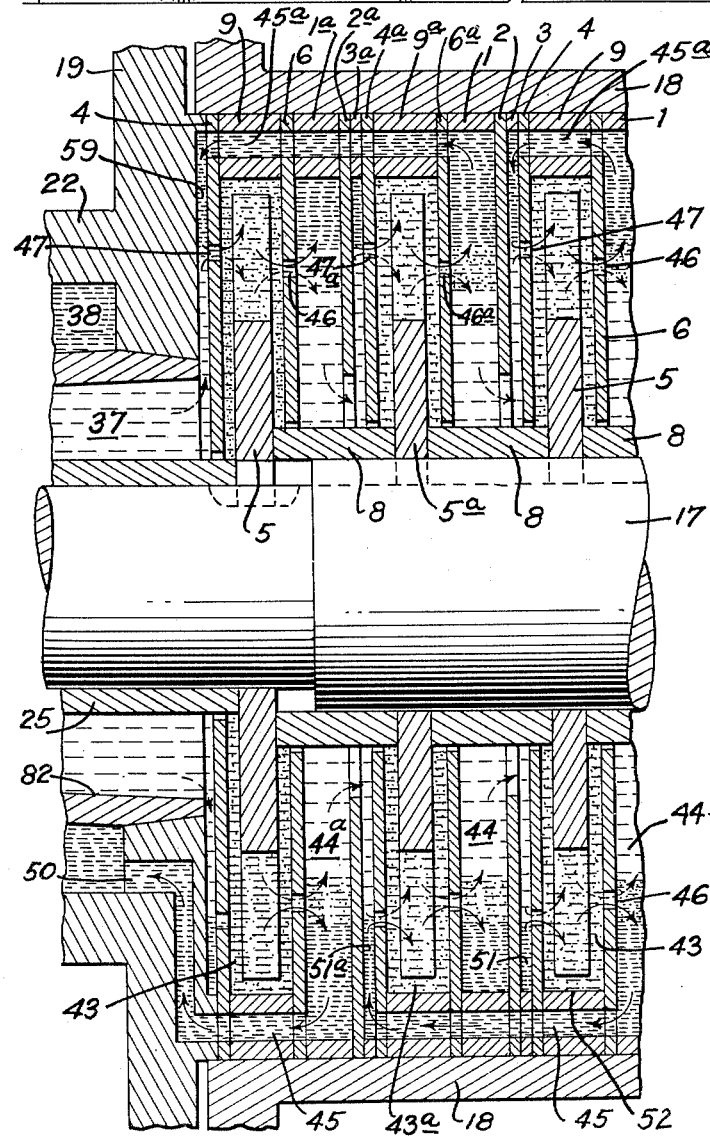
Fig. 4 is an enlarged view of a portion of Fig. 2 showing the contacting means in enlarged sectional detail.

The flow of fluids through a typical pair of stages will now be traced with particular reference to the enlarged view in Fig. 4. The less dense fluid, coming by centrifugal force to the inner liquid surface of separating chamber 44 passes to the right over the inner circumference of separating chamber disc 2 and into converger chamber 51 where it meets the denser fluid that enters chamber 51 via ports 45ª. The two fluids feed from chamber 51 through holes 47 in mixing chamber inlet disc 4 and into mixing chamber 43. Due to the difference in the rates of rotation between shaft 17 and shell 18, agitator rotor 5 mixes the two fluids. The mixing action is aided by the inner teeth 52 of mixing chamber spacer 9. A thorough mixing is highly desirable in order to increase the rate of transfer of the solute across the interface between the two fluids. The mixed fluids pass out of mixing chamber 43 and into settling chamber 44ª by means of holes 46 in agitator outlet disc 6.

In separating chamber 44ª the fluids become relatively quiescent and separate into two layers; the denser fluid fills the spaces near the circumference, while the less dense fluid rides upon the inner surface of the denser fluid.

Between the two fluid layers in the separating chamber there may be a layer of the mixed phases. The less dense fluid passes to the right from separating chamber 44ª inside the inner lip of separating chamber disc 2ª, thence into mixing chamber 43ª via feed chamber 51ª. Mixing chamber 43ª is one stage advanced from the contiguous mixing chamber 43, and the less dense fluid has completed one stage of countercurrent contact with the denser fluid by moving through 43 to 43ª. So also, the denser fluid completes one stage of countercurrent contact in moving from stage 43ª to 43.

It is to be emphasized that although both fluids flow together to the right through the mixing chamber, it is only the less dense fluid that persists in flowing generally to the right in all channels. The denser fluid flows to the right with the less dense fluid through the mixing chamber, then separates from the less dense fluid, and doubles back on its path by moving to the left through passageway 45 and 45ª into the adjacent mixing chamber to the left of that from which it came. The denser fluid separating to the periphery of separating chambers 44 passes to the left through ports 45ª whereas the denser fluid that separates in chambers 44ª passes to the left through ports 45.

When shell 18 is rotated at a more rapide rate than shaft 17, then the average rate of rotation of the mixing liquids in the mixing chambers will be between the rates of rotation of 17 and 18. Now the centers of the inlet holes 47 and 47ª in mixing chamber inlet disc 4 and 4ª respectively lie on a circle whose center is at the axis of shell 18, and likewise the centers of the mixing chamber outlet holes 46 and 46ª in discs 6 and 6ª respectively lie on a circle whose center is at the axis of shell 18. It follows, then, that when holes 47, 47ª, 46 and 46ª are equidistant from the axis of 18, there can be a tendency for an agitator rotor to propel the fluids through the mixing chamber if said agitator has some of the characteristics of a screw propeller. Agitator rotors rotating slower than shell 18 and not having the characteristics of a screw propeller can propel the fluids through the mixing chambers from left to right if holes 47 lie on a larger circle than holes 46; and, conversely if said agitator rotors are rotated more rapidly than shell 18 they can propel the fluids through the mixing chambers from left to right if holes 47 lie on a smaller circle than holes 46.

In the embodiment of the invention represented in Figs. 1 to 6 inclusive, the agitator has none of the propelling characteristics of a screw, however, propulsion of the fluids from left to right is accomplished by means of centrifugal force; holes 47 lie on a larger circle than holes 46, and agitator rotors 5 rotate more slowly than shell 18. Each agitator operates as a pump; by proper regulation of the pumping action, one agitator can be made just sufficient to overcome the frictional resistance of the fluids in circulating through one stage comprising a separator chamber, a converger chamber and a mixing chamber. Hence the machine can be adapted to contact viscous fluids in a hundred or more stages, or in a small number of stages.

The machine shown in Figure 1 may be built in any number of sizes and capacities. Thus a small machine in which each stage occupies five-eighths of an inch has a shell 18 about sixty-four inches long, and has one hundred and fifteen stages, or approximately one hundred equivalent stages. By increasing the dimensions of all parts, machines for large scale production can be constructed. The throughput capacity will increase as the square of the diameter of shell 18. The rate of throughput can also be varied by changing the relative rates of rotation of shaft 17 and shell 18.

For the purpose of illustrating one use of an apparatus constructed according to my invention, the following description of such use is given by way of example: An apparatus constructed after the style of Figures 1 and 2 and having a shell 18 of four inches diameter and sixty-four inches length, had one hundred fifteen physical stages. This apparatus was put into use contacting gasoline countercurrently with an aqueous solution containing five per cent (5%) sodium hydroxide in order to remove from the gasoline certain mercaptan compounds. When the shell of the apparatus was rotated at 1500 revolutions per minute, and the agitators at 600 revolutions per minute, this apparatus had a total throughput capacity of one gallon per minute, said throughput capacity being reckoned as the sum of the volumes of the gasoline and caustic liquid phases passing through the apparatus in one minute of operation.

The result of such countercurrent treatment of gasoline in the apparatus by aqueous caustic solution is to extract a sufficient quantity of mercaptans from the gasoline to render it "sweet" to the "doctor test." When a fresh caustic solution is used, practically all of the mercaptans are readily removed from the gasoline phase and are carried off by the caustic. But since this requires a large expenditure of caustic it is more economical to continuously remove a portion of the dissolved mercaptans from the aqueous caustic by steam blowing or some other method and to circulate the regenerated caustic through the extraction apparatus repeatedly before discarding said caustic.

It is known that steam blowing readily removes the heavier mercaptans from the caustic soda, but that it removes the lighter mercaptans with some difficulty. The lighter mercaptans accumulate in the caustic liquor to the extent that eventually the liquor must be discarded. In Table 1 the results of an experiment are given in which one-half gallon per minute of five per cent (5%)

caustic soda solution was used to treat one-half gallon per minute of sour gasoline. Column 1 shows values of $(x)_f$, the concentrations of the various mercaptans present in an untreated sour gasoline analysed according to the method of Happel & Robertson, Ind. & Eng. Chem. vol. 27, page 941 (1935). Column 2 shows values of $(x)_n$, the concentrations of the various mercaptans remaining in the gasoline after the gasoline has traversed the apparatus countercurrently to an aqueous solution containing five per cent (5%) free caustic soda, and the concentrations $(y)_n$ of the various mercaptans indicated in column 3.

The particular caustic solution referred to in column 3 had made approximately one hundred circuits of a cycle comprising circulating countercurrently to gasoline of the quality described and regeneration by steam blowing. Said caustic solution has now accumulated a sufficient amount of the lighter mercaptans to render it unsuitable for further treatment of sour gasoline; it must be discarded, and a fresh batch of caustic soda solution added to the system. In order to maintain the efficiency of the aqueous caustic liquor, solid caustic soda was added continuously in amounts equal to the amount of caustic soda neutralized by accumulated mercaptans.

*Table 1*

| Mercaptans | Column 1 $(x)_f$ in lbs. mercaptan sulfur per gallon | Column 2 $(x)_n$ in lbs. mercaptan sulfur per gallon | Column 3 $(y)_n$ in lbs. mercaptan sulfur per gallon |
| --- | --- | --- | --- |
| Methyl | 0.006 | 0.0012 | 0.60 |
| Ethyl | 0.0042 | 0.0008 | 0.084 |
| Propyl | 0.0021 | 0.0002 | 0.003 |
| Butyl | 0.0019 | 0.00006 | 0.000264 |
| Amyl | 0.0011 | 0.00002 | 0.000022 |
| Totals | 0.0153 | 0.00228 | 0.687286 |

In the particular embodiment of the present invention that is portrayed in Figs. 7 to 12 inclusive the contacting means comprises a rotating impervious housing 102 containing a female screw 125, and an independently rotating internal member 101 on which is a male screw 126. The diameters of the two screws are such that the male screw may be rotated inside the female screw without contacting the threads of said female screw. In operation the denser fluid is propelled in one direction by rotation of the female screw, and the less dense fluid is propelled in the opposite direction by the male screw.

The machine is mounted upon a base 140. At the ends of the base are bearings 103 and 104 that carry shaft 105. Housing 102 is rotatably mounted upon shaft 105 by means of bearings 109 and 110 provided at each end of the housing. Rotor 101 is mounted inside of housing 102, and is made firm to shaft 105 by means of keys 106 and setscrews 142. The preferred adjustment of parts is such that the axis of housing 102 and the axis of rotor 101 coincide, and either part is free to rotate independently without interference with the other. Wall 189 clears flange 187 sufficiently to prevent interference between the two members.

Power applied by means of a belt to pulley 108 rotates housing 102. Power applied by means of a belt to pulley 107 rotates rotor 101.

The less dense fluid is fed into the machine by way of pipe 115. Packing box 111 causes the lighter fluid to flow into the interior 120 of shaft 105 through port 116. The less dense fluid travels to the right through channel 120 to port 117 from which port the less dense fluid is discharged into space 122. The less dense fluid then enters the contacting region between the male and female screws and travels in a helical path progressing toward the right. At the right hand end of the machine the less dense fluid is discharged into stationary annular trough 132 from spout 131. The denser fluid from pipe 114 is guided by packing box 112 to enter port 118 of shaft 105. The denser fluid travels from port 118 leftward through channel 121 to port 119, thence into chamber 123 and to the threaded portion housing 102 via holes 124.

Due to the centrifugal forces induced by the rotation of housing 102 and rotor 101, the denser fluid fills the spaces between the threads 125 of housing 102. The less dense fluid rides on the inner surface of the denser fluid; the less dense fluid fills the spaces between threads 126.

The interface between the two fluids is regulated to be approximately in the clear space between the tips of threads 125 and the tips of the threads 126. The position of the interface is regulated by adjusting the distances from the overflow ports 134 and 135 to the axis of rotation. These distances are dictated in part by the relative densities of the fluids being treated, by the rates of rotation of housing 102 and rotor 101, and by the character of the screws. Ring 149 acts as a siphon that permits passage of the denser fluid through port 134, but keeps back the less dense fluid.

The denser fluid arriving at 149 passes through port 134 and sprays out rotating spout 128 to be caught by stationary annular trough 129. The denser fluid drains to the bottom of trough 129 and passes out of the machine through pipe 130.

The less dense fluid arriving at port 135 sprays out rotating spouts 131 and is caught by stationary annular trough 132. The less dense fluid drains to the bottom of trough 132 and passes out of the machine through pipe 133.

Troughs 129 and 132 are attached to a cylindrical baffle 141 that serves as a brace for the two troughs, and that also serves to catch sprays of liquids that may escape the troughs. Trough 129 is attached to frame 140 by bracket 789, and trough 132 is attached to frame 140 by bracket 189.

The male screw may be held stationary if desired, and the female screw only rotated; or the female screw may be held stationary and the male screw only rotated.

Threads 126 and 125 are both right hand threads. Housing 102 and rotor 101 are both rotated in a counterclockwise sense when viewed as in Fig. 8. Housing 102 rotates more rapidly than rotor 101. The rotation is such that the upper part of both rotor and housing progresses toward the observer when said parts are viewed as in Figs. 7, 9, and 10.

The more rapid rotation of housing 102 in the sense described combined with the less rapid rotation of rotor 101 in the same sense causes the denser fluid clinging to threads 125, to drift toward the left, and likewise the rotation of the parts causes the less dense fluid clinging to threads 126 to drift toward the right.

The denser fluid entering the right-hand end of the threads tends to rotate at the same rate as housing 102. The less dense fluid entering the left-hand end of the threads tends to rotate at the same rate as rotor 101. If housing 102 turns, for example, at 1200 revolutions per minute and rotor 101 at 500 there is a strong centrifugal force set up that insures that the denser fluid maintains its position adjacent to threads 125, and the less dense fluid floats upon the denser and fills the space adjacent to threads 126. Due to the fractional drag between the threads and the respective fluid phases in contact with the threads, and due to the fluid friction at the interface between the two fluids, the denser fluid rotates at an average rate somewhat slower than that of the housing, so the denser fluid is thrust toward the left by the action of screw threads 125; so also for the same frictional reasons, the less dense fluid rotates at an average rate somewhat slower than that of the rotor and the less dense fluid is therefore thrust toward the right by the action of screw threads 126. Countercurrent contacting takes place at the interface between the two fluid phases.

The difference in the rates of rotation of the denser and less dense fluids cause a shearing action to occur at the interface 127. There is also a shearing action in the interior portions of both liquid bodies. Both the interfacial shearing action and the internal shearing action give rise to agitation within the respective fluid phases, but not to substantial mixing of the phases and encourage a rapid rate of transfer of the solute from one phase to the other over the interfacial boundary 127.

The interface between the two fluids can be made large in area, and the volume of liquids being treated can be made small by making the threads shallow. The number of equivalent stages can be increased by decreasing the rate of flow of the fluids or by providing a longer rotor and housing, or by increasing the number of threads.

In Fig. 11 a machine constructed according to the present invention is shown encased in a pressure vessel 150. In applications requiring countercurrent treatment of fluids under high pressures this construction is useful to prevent excessive leakage of high pressure fluids from the packing boxes 15 and 16 and to maintain the required pressure within the contacting regions of machines constructed as that shown in Fig. 7.

Rotational motion is imparted to the machine parts in Figs. 11 and 12 by shafts 151 and 152. Pipes lead the fluids into and out of the machine. Shaft 151 extends into the pressure vessel through packing box 157; it is mounted to rotate in bearings 159 and 160. Through gear 153 and pinion 154 shaft 151 is connected to rotate the rotor of a countercurrent extracting machine constructed according to the present invention. Similarly, shaft 152 extends through packing box 158 and into the interior of the pressure vessel where said shaft is mounted to rotate in bearings 162. Bearings 159, 160 and 162 are attached to 210 which is the base of the countercurrent contacting machine.

Valve 115ª connected to pipe 115 is the inlet for one of the fluids. Valve 114ª connected to pipe 114 is the inlet for the other fluid. Valve 130ª connected to pipe 130 is the outlet for one fluid. Valve 133ª connected to pipe 133 is the outlet for the other fluid. Pipes 115, 114, 130 and 133 are sealed into cover 300. Cover 300 is fastened to vessel 150 in a detachable manner, but sufficiently firm to prevent leakage.

Base 210 is fastened in a firm manner to cover 300, and 300 in turn is made integral with sub-base 211. Sub-base 211 is sufficiently strong that when bolted to a firm foundation it will support the entire apparatus. This construction permits vessel 150 to be unbolted from cover 300 and removed for inspection of the machine while said vessel 150 is being supported by eyes 181.

By way of example only, reference will be had to the treatment of kerosene, consisting essentially of a mixture of those aromatic and paraffine hydrocarbons that boil between 200° C. and 300° C., countercurrently with liquified sulfur dioxide in sufficient quantity that the aromatic hydrocarbons are selectively absorbed into the sulfur dioxide phase, although it is understood that the apparatus is applicable to any process involving the countercurrent treatment of two immiscible fluids.

A quantity of liquid sulfur dioxide is admitted to pressure vessel 150 by way of valve 170. This immediately evaporates until there is sufficient pressure generated to maintain sulfur dioxide in the liquid state inside 150. Excess liquid is drawn off through valve 186. Liquified sulfur dioxide is then introduced into the apparatus through valve 114ª, and crude kerosene is introduced into the apparatus through valve 115ª.

The liquid sulfur dioxide, being the denser fluid, assumes the outermost positions in the extracting apparatus, and progresses toward the left inside the rotating housing and is discharged through pipe 130 and valve 130ª. The kerosene, being the less dense fluid, progresses toward the right and is discharged through pipe 133 and valve 133ª. In traversing through the apparatus, the kerosene passes the liquid sulfur dioxide in countercurrent fashion. The kerosene gives up its aromatic components to the sulfur dioxide, so that the raffinate pasing out pipe 133 consists of the paraffinic portion of the crude kerosene fed into the apparatus, and the extract phase which passes out pipe 130 consists of liquified sulphur dioxide in which the aromatic components of the crude kerosene have been dissolved.

From the foregoing description taken in connection with the accompanying drawings, the method of operation and the uses and advantages of my invention will be readily understood by those skilled in the art to which it appertains.

While I have described the principle of operation, together with the forms of my invention, which I now consider to be the best embodiment thereof, I desire to have it understood that the articles shown are merely illustrative and that the invention is not to be limited to the details disclosed herein, but is to be accorded the full scope of the appended claims.

I claim:

1. An apparatus for the treatment of substantially immiscible liquids of differing densities which comprises a rotating shell having a relatively large number of spacers and discs dividing said shell into a relatively large number of treating zones arranged in contiguous relationship to form a series, every third treating zone comprising a mixing zone containing an agitator, contiguous to one side of said mixing zone a converging zone for the purpose of contacting the liquids at an interface, ports located at said interface for conducting the liquids into the mixing zone, ports located on the opposite side of said mixing zone for conducting the liquids out of the mixing zone and into a separating zone, a conduit for connecting the outermost portion of said separating zone with the outermost portion of a preceding converging zone, means for connecting the innermost portion of said separating chamber with the innermost portion of a succeeding converging chamber, means for supplying the less dense liquid to the first zone of the series, means for withdrawing the less dense liquid from the last zone of the series, means for supplying the denser liquid to the last zone of the series, means for withdrawing the denser liquid after it has traversed the series and independent driving means for said shell and said agitators.

2. An apparatus for the treatment of a liquid and a gas which comprises a rotating shell having a plurality of spacers and discs dividing said shell into a plurality of treating zones arranged in contiguous relationship to form a series, every third treating zone comprising a mixing zone containing an agitator, contiguous to one side of said mixing zone a converging zone for the purpose of contacting the fluids at an interface, ports located at said interface for conducting the fluids into the mixing zone, ports located on the opposite side of said mixing zone for conducting the fluids out of the mixing zone and into a separating zone, a conduit for connecting the outermost portion of said separating zone with the outermost portion of a preceding converging zone, means for connecting the innermost portion of said separating zone with the innermost portion of a succeeding converging zone, means for supplying the liquid to the first zone of the series, means for withdrawing the liquid from the last zone of the series, means for supplying the gas to the last zone of the series, means for withdrawing the gas after it has traversed the series and independent driving means for rotating said shell and said agitators.

3. An apparatus for contacting fluids comprising a housing, an independent internal member, fluid contacting means comprising a female thread in said housing and a male thread on said independent internal member, means for introducing a denser fluid into an end of said fluid contacting means, means for withdrawing said denser fluid from the opposite end of said fluid contacting means, means for introducing a less dense fluid into said last-mentioned end of said fluid contacting means, means for withdrawing said less dense fluid from said first-mentioned end of said contacting means, and means for rotating said housing independently of said internal member.

4. An apparatus for contacting fluids comprising a housing, an independent internal member, fluid contacting means comprising a female thread in said housing and a male thread on said independent internal member, means for introducing a denser fluid into an end of said fluid contacting means, means for withdrawing said denser fluid from the opposite end of said fluid contacting means, means for introducing a less dense fluid into said last-mentioned end of said fluid contacting means, means for withdrawing said less dense fluid from said first-mentioned end of said contacting means and means for rotating said internal member independently of said housing.

5. An apparatus for contacting fluids comprising a member adapted for rotation, a second member in said first-mentioned member adapted for rotation, means for rotating said members, guide means constructed and arranged whereby the centrifugal force induced by the rotation of said members propels the more dense fluid in one direction, and means associated with the last-mentioned member whereby the centrifugal force induced by the rotation of said members simultaneously propels the less dense fluid in the opposite direction.

6. An apparatus for contacting fluids comprising a member adapted for rotation, a second member in said first-mentioned member adapted for rotation, means for rotating said members, means associated with the first-mentioned member whereby the centrifugal force induced by the rotation of said members propels the more dense fluid in one direction, and means associated with the last-mentioned member whereby the centrifugal force induced by the rotation of said members simultaneously propels the less dense fluid in the opposite direction.

7. An apparatus for contacting fluids comprising a member adapted for rotation, a second member in said first-mentioned member adapted for rotation at a speed different from that of the first-mentioned member, means for rotating said members at different rates of speed with respect to each other, means associated with the first-mentioned member whereby the centrifugal force induced by the rotation of said members propels the more dense fluid in one direction, and means associated with the last-mentioned member whereby the centrifugal force induced by the rotation of said members simultaneously propels the less dense fluid in the opposite direction.

8. An apparatus for contacting fluids comprising a member adapted for rotation, a second member in said first-mentioned member adapted for rotation, means for rotating said members, a helical contour on the inner surface of the first-mentioned member whereby the centrifugal force induced by the rotation of said members propels the more dense fluid in one direction, and a helical contour on the outer surface of the last-mentioned member whereby the centrifugal force induced by the rotation of said members simultaneously propels the less dense fluid in the opposite direction.

WELLS ALAN WEBB.